Nov. 24, 1964   C. R. BROWN   3,158,321
THERMOSTATICALLY CONTROLLED CLUTCH FOR VEHICLE FAN
Filed Sept. 12, 1963   2 Sheets-Sheet 1

INVENTOR.
CHESTER R. BROWN.
BY *Cullen, Sloman & Cantor*
ATTORNEYS

Nov. 24, 1964 C. R. BROWN 3,158,321
THERMOSTATICALLY CONTROLLED CLUTCH FOR VEHICLE FAN
Filed Sept. 12, 1963 2 Sheets-Sheet 2

INVENTOR.
CHESTER R. BROWN.
BY Cullen, Roman & Caster
ATTORNEYS

United States Patent Office 3,158,321
Patented Nov. 24, 1964

3,158,321
THERMOSTATICALLY CONTROLLED CLUTCH
FOR VEHICLE FAN
Chester R. Brown, Onaway, Mich.
(1245 Forest Ave., Roger City, Mich.)
Filed Sept. 12, 1963, Ser. No. 308,506
5 Claims. (Cl. 236—35)

The present invention relates to a thermostatically operated clutch for engine cooling fans.

Heretofore, in many engines, the fan for the cooling system is continuously rotatable under a direct drive from the crank shaft or other power take off. Under some conditions a fan is not needed, such as a warm-up period, during operation in extremely cool weather, in traveling on the freeways at higher speeds, and when movement of air is sufficient to effect cooling without the operation of the fan.

Another disadvantage of continued operation of the fan is that it uses horsepower and creates additional unnecessary vibrations and noise which can be eliminated if a means is provided for disconnecting the fan when it is not needed.

It is an object of the present invention to provide a novel form of thermostatically controlled clutch assembly for an engine fan by which unless and until the temperature of the cooling system reaches normal efficient operating temperature, the fan will be disconnected and becomes activated only above this temperature.

It is another object to provide a clutch assembly between the fan and the drive therefor, normally engaged at temperatures above normal efficient operating temperature, for example, and with thermostatically controlled mechanism operable to disengage the clutch assembly and to release the fan rendering the same inoperative whenever the temperature falls below a predetermined set temperature.

These and other objects will be seen from the following specification and claims in conjunction with the appended drawings in which:

It will be understood that the above drawings illustrate merely a preferred embodiment of the invention and that other embodiments are contemplated within the scope of the claims hereafter set forth.

Figure 1:
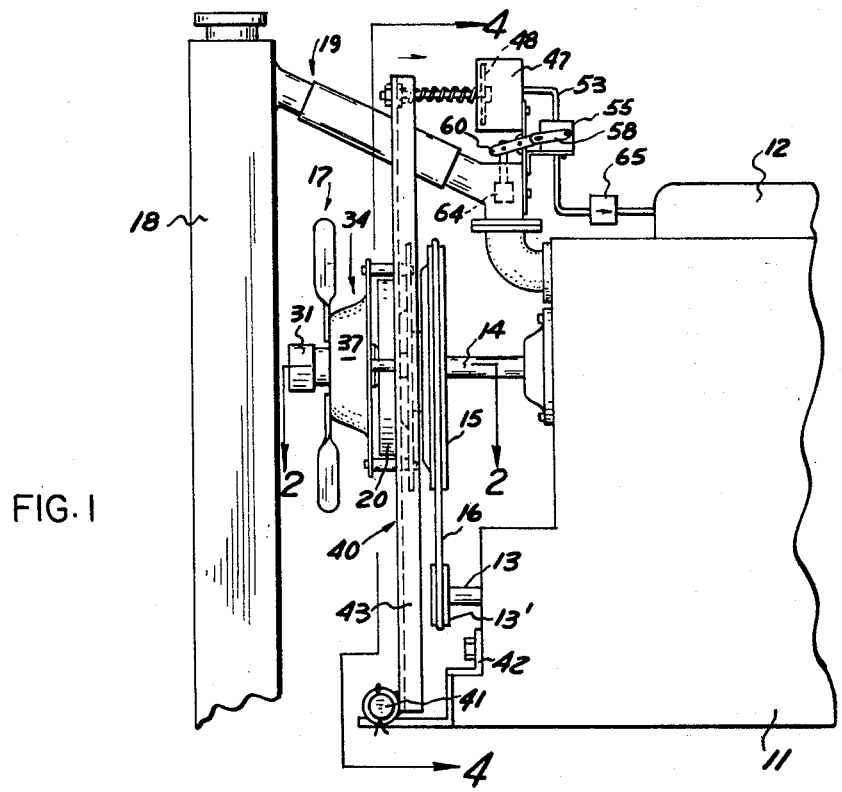
FIG. 1 is a fragmentary and schematic side elevational view of a vehicle engine with the present thermostatically controlled fan clutch assembly shown.

Referring to FIG. 1, a vehicle engine is schematically and fragmentarily shown at 11, including manifold 12, crank shaft 13, water pump or support shaft 14, with fan driving pulley 15 thereon. Belt 16 transmits rotative power from crank shaft pulley 13' to pulley 15 on shaft 14 for controlling rotation of fan 17 subject to the control of the present clutch assembly. Radiator 18 and hot water pipe 19 to the engine block 11 are schematically shown.

*Clutch Plate Assembly*

Figure 2:
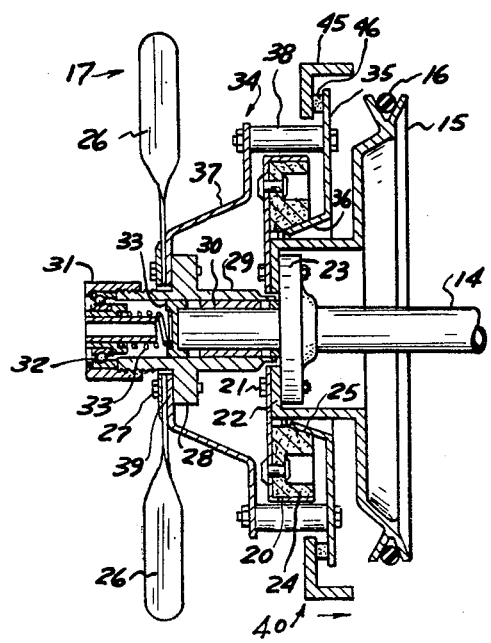
FIG. 2 is a fragmentary section taken in the direction of arrows 2—2 of FIG. 1.

Referring to FIG. 2, the annular cup shaped clutch plate 20 is axially mounted over support shaft 14 and is fixedly secured to power driven pulley 15. Inner portions of clutch plate 20 adjacent shaft 14 overlie annular flange 22 forming a part of pulley 15 and are secured thereto by a series of fasteners 21. Pulley 15 includes annular hub 23 journaled upon shaft 14 and fixedly secured by fasteners 21 to flange 22 and clutch plate 20. Said clutch plate carries therein the conventional fiber or other friction means 24 having a conically shaped opening 25 adapted to receive the similarly shaped clutch 36 to establish a driving relation therebetween.

*The Fan*

Fan 17 includes a series of radially directed blades 26 with a central webbing secured at 27 to annular shoulder 28 on hollow elongated cylindrical hub 29.

Hub 29 is axially and rotatively journaled on support shaft 14 with bearing 30 interposed, and at its outer end has mounted thereover closure cap 31.

Bearing 32 is retained within cap 31 so that its inner race seats coiled spring 33 which is interposed in compression between said bearing and retainer 33' upon the outer end of shaft 14.

*Clutch Assembly*

The clutch assembly generally indicated at 34 includes plate 35 axially mounted over and around shaft 14 and including conically shaped central portion 36 normally registrable frictionally with clutch plate friction means 24. Annular formed housing 37 is arranged forwardly and axially of plate 35 and is secured thereto by a series of spacers and associated fasteners 38, FIG. 2, and includes towards its forward end an annular flange 93 of reduced dimension which is mounted on hub 29 and fixedly secured thereto by fasteners 27.

Fan blades 26 are adapted for rotation in unison with cludes towards its forward end an annular flange 39 of compression, into frictional driven engagement with clutch plate 20–24 effecting normal power rotation of fan 17.

*Clutch Disengaging Frame*

Referring to FIGS. 1–4, a hollow frame 40 generally surrounds clutch 34 and is pivotally mounted upon engine 11 and is adapted to operatively engage plate 35 forming a part of clutch 34 for disengaging the clutch whenever the temperature of the cooling fluid in the radiator drops below the normal efficient operating temperature, as for example, about 165° F. to 170° F.

Figure 4:
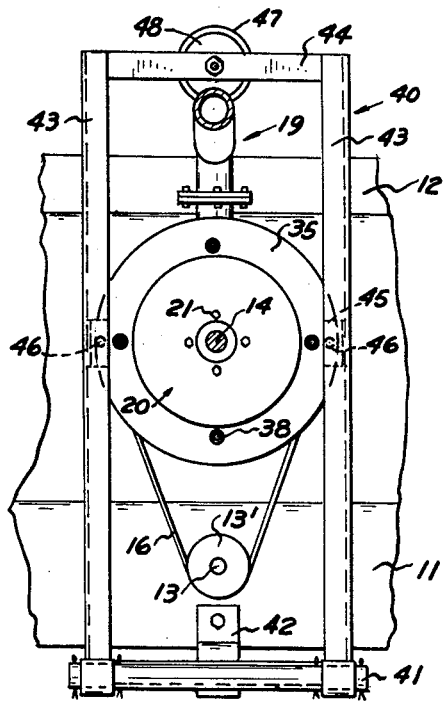
FIG. 4 is a front elevational view of the motor operated clutch disengaging frame.

Bracket 42, FIG. 4, is mounted upon and secured to a forward portion of engine 11 and disposed through said bracket and secured thereon is transverse shaft 41. The frame 40 includes side bars 43 interconnected at their upper ends by cross-plate 44 and at their respective lower ends pivotally mounted upon support rod 41. Bars 43 intermediate their ends include flanges 45. These flanges carry fiber or other suitable friction stops 46 adapted for cooperative engagement with rotatable clutch plate 35–36 for axially moving and disengaging the same from clutch plate 20–24.

This disengaging action is accomplished against the action of coil spring 33 compressing the same. When frame 40 is returned to a pre-determined position, coil spring 33 is again effective to re-engage clutch 34 and establish a driving relation from the engine to the fan.

*Manifold Operated Motor for Clutch Frame*

The means for effecting pivotal movements of frame 40 for disengaging clutch 34 includes a suitable pneumatic motor, as for example, a cylinder, or in the present case a housing 47 which includes across one end thereof the flexible diaphragm 48. Rod 49 is secured centrally to said diaphragm at one end and at its opposite end is secured at 50 to frame cross bar 44, FIG. 4, there being a suitable coil spring 51 interposed.

Figure 3:
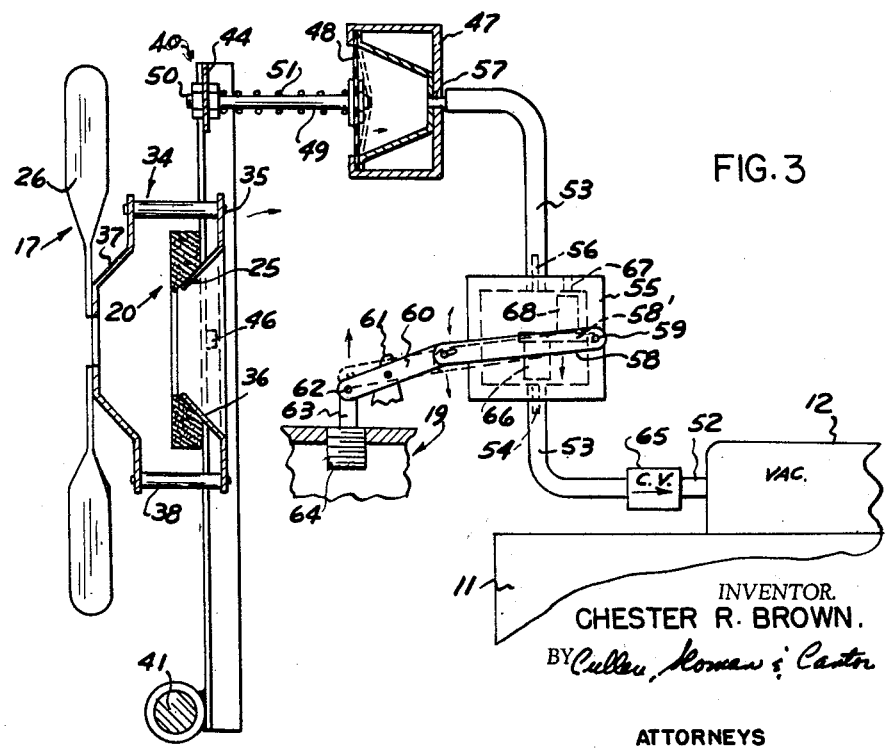
FIG. 3 is a schematic diagram illustrating the thermostatically controlled valve for regulating communication of vacuum to the clutch operating motor.

The manifold 12, FIG. 1, is schematically shown in the diagram, FIG. 3, and has an outlet fitting 52 to which is connected flexible conduit 53 connecting fitting 54 of the thermostatically controlled valve 55. This valve in turn has an outlet fitting 56 which through additional flexible conduit 53 joins motor fitting 57, FIG. 3, for establishing vacuum communication between manifold 12 and the interior of the motor housing 47 to act upon the diaphragm 48, FIG. 1, or a piston within a cylinder.

The valve 55, schematically shown in FIG. 3, has a movable control arm 58 pivotally mounted at 59 upon the valve housing. Arm 58 is controlled by lever 60 which is pivotally mounted at 61 upon the engine.

One end of lever 60 as at 62 is operatively connected with the movable element 63 of the thermostat 64 which is nested within the conduit connection 19 of the cooling system between radiator 18 and engine 11.

Operation

When the engine is below normal efficient operating temperature, as for example, a water temperature below about 165° F. to 170° F., the movable element 63 of thermostat 64 assumes the position shown in FIG. 3. Lever 60 maintains control arm 58 on valve 55 in the inclined solid-line position shown. Under these conditions vacuum from manifold 12 is free to pass through valve 55 and conduit 53 to the diaphragm or motor housing 47 causing a flexing of the diaphragm inwardly with reference to FIG. 1, or to the right with reference to FIG. 3 in turn effecting a pivotal movement of frame 40 towards the engine to disengage the clutch assembly 34.

For all operations of the engine wherein the radiator water temperature stays below 165° F. to 170° F. for illustration, the fan will be disengaged. Should the operation of the engine or the climate or other conditions be such that the engine temperature drops below normal efficient operating temperature, 165° F. to 170° F., for example, then in that case, had the fan been operating, the fan is then disengaged.

Just as soon as the temperature of the engine is elevated above the pre-set 165° F. to 170° F., thermostat element 63 moves causing a downward tilting movement of lever 60 to the dotted line position, FIG. 3, causing a corresponding downward tilting movement of arm 58 on valve 55 to the dotted line position shown. Plug 66 on the interior of the valve is connected to arm 58 and seats over the inner end of fitting 54.

This effectively closes off vacuum communication between manifold 12 and motor 47. A suitable check valve 65 is interposed in conduit 53 between said manifold and valve to prevent vacuum in motor 47 from equalizing with vacuum in manifold 12 due to a decrease of vacuum in manifold 12. With vacuum communication to motor 47 disconnected, diaphragm or piston 48 reassumes its normal position by spring 51, FIGS. 1 and 3, and under the action of coil spring 33 clutch 34 is re-engaged and fan 17 activated.

Valve 55 is also so constructed that when the movable valve element controlled by arm 58 is adjusted as to cut off vacuum communication to the motor, the said valve is suitably vented to atmosphere permitting the diaphragm to return to normal position. Vent 67 is normally closed by plug 68 on arm 58. When said arm drops, vent 67 is uncovered.

In normal operation, bearing 32, FIG. 2, is provided within cap 31 to prevent unnecessary rotation of spring 33 with respect to the end of support shaft 14. The outer end of spring 33, normally under compression, is retained by the bearing race which forms a part of bearing 32. Thus, rotation of cap 31 connected with the fan will be independent of spring 33.

Having described my invention, reference should now be had to the following claims:

I claim:
1. In combination with an engine having an intake manifold, a support shaft, a power driven pulley journaled thereon, a cooling system and a fan;
   the improvement comprising an annular driving clutch plate axially secured to said pulley for rotation therewith;
   said fan including a hollow cylindrical hub axially journaled on said support shaft, longitudinally movable thereon and at its outer end projected axially outward thereof;
   a closure cap over the outer end of said hub longitudinally spaced from the shaft;
   a longitudinally reciprocal driven clutch plate secured to said hub and including a cone cooperatively registerable with said driving clutch plate;
   a coiled spring within said hub interposed between said cap and support shaft normally urging said cone into driven relation with said driving clutch plate;
   an open frame surrounding said clutch plate pivotally mounted upon said engine;
   a manifold operated motor mounted on the engine including a reciprocal diaphragm connected to said frame; and
   a thermostatically operated valve control to actuate said motor when the normal efficient operating temperature is below a pre-determined value for flexing said diaphragm and moving said frame into operative engagement with said driven clutch plate for disengaging the cone from said driving clutch plate.

2. In the thermostatic fan clutch assembly for engines defined in claim 1, and a bearing anchored within said cap including a stationary race interposed between said cap and said spring.

3. In the thermostatically controlled fan clutch defined in claim 1, said driven plate clutch including an annular housing surrounding and at one end secured to said hub and towards its opposite end radially enlarged and peripherally secured to said driven clutch plate.

4. In the thermostatically controlled fan clutch of claim 1, said driven clutch plate including an annular flange parallel to and normally spaced from said frame, said frame on tilting movement operatively engaging said flange effecting a longitudinal movement of said driven clutch plate.

5. In the thermostatically operated fan clutch defined in claim 1, and a conduit between said manifold and motor, the vacuum from said manifold normally biasing said reciprocal diaphragm and connected frame for movement in one direction maintaining the cone of said driven clutch plate disengaged and the fan stationary, said thermostatically operated valve control including a normally open valve connected into said conduit, and which upon activation closes off vacuum communication to said motor releasing said frame for movement in the opposite direction, said spring functioning to engage said cone with said driving clutch plate causing the fan to rotate, the reciprocal diaphragm of said motor being biased to return to a normal inoperative position.

References Cited in the file of this patent
UNITED STATES PATENTS

| | | |
|---|---|---|
| 2,454,182 | Kanpa | Nov. 16, 1948 |
| 2,706,468 | Willcox | Apr. 19, 1955 |
| 2,786,456 | Heiss | Mar. 26, 1957 |
| 3,103,308 | Wolfram | Sept. 10, 1963 |